Oct. 21, 1958   G. M. LEITCH ET AL   2,857,561
SERVO CONTROL SYSTEM
Filed Nov. 6, 1953   2 Sheets-Sheet 1

*INVENTORS.*
GEORGE M. LEITCH
HAROLD C. TRUEBLOOD
BY William R. Lane
ATTORNEY

Oct. 21, 1958 G. M. LEITCH ET AL 2,857,561
SERVO CONTROL SYSTEM

Filed Nov. 6, 1953 2 Sheets-Sheet 2

*INVENTORS.*
GEORGE M. LEITCH
HAROLD C. TRUEBLOOD
BY
*William R. Lane*
ATTORNEY

United States Patent Office 2,857,561
Patented Oct. 21, 1958

2,857,561

SERVO CONTROL SYSTEM

George M. Leitch, Whittier, and Harold C. Trueblood, Los Angeles, Calif., assignors to North American Aviation, Inc.

Application November 6, 1953, Serial No. 390,642

6 Claims. (Cl. 318—28)

This invention is a servo system which precisely controls a motor in accordance with an input signal.

Accurately driving and positioning a motor according to an input signal has innumerable applications. Each application, however, has its own characteristics to which the motor and control system must be adapted. The servo control amplifier of the system is suitable for a broad range of applications and is readily adapted to others.

To provide adequate power, a magnetic amplifier is employed to drive the motor. Consequently, the required B+ power is considerably less than in an all-electronic amplifier. Incorporation of the magnetic amplifier increases the ruggedness and reliability of the device.

By the use of a signal modulated carrier, two stages of A.-C. amplification can be used to increase the signal level. Subsequent demodulation permits D.-C. equalization which requires considerably less circuitry than A.-C. equalization and can be modified by plug-in substitution.

Ordinarily, a particular servo amplifier is limited to a narrow range of carrier frequencies, and must be redesigned for others. This device requires slight modification to utilize carrier frequencies as high as several thousand cycles per second.

As a result of careful design, stabilization over a broad range of signal frequencies with a minimum response time is acquired.

In addition to a feedback loop which controls the position of the motor, a generator feedback circuit is included to add to the stability. The circuit may be changed by component substitution for feedback in accordance with the acceleration or velocity of the motor.

In other amplifier systems, quadrature voltages appearing at the input cause error and, sometimes, instability. The instant invention is relatively insensitive to such voltages.

It is therefore an object of this invention to provide an improved servo control system.

It is another object of this invention to provide an improved servo control amplifier.

It is another object of this invention to provide a servo system that is easily modified to fit a broad range of applications.

A further object of this invention is to provide a servo control amplifier having a minimum response time.

A still further object of this invention is to provide a servo amplifier of increased ruggedness and reliability.

Other objects of invention will become apparent from the following description taken in connection with the accompanying drawings, in which Fig. 1 is a schematic drawing of the invention;

Figure 1:
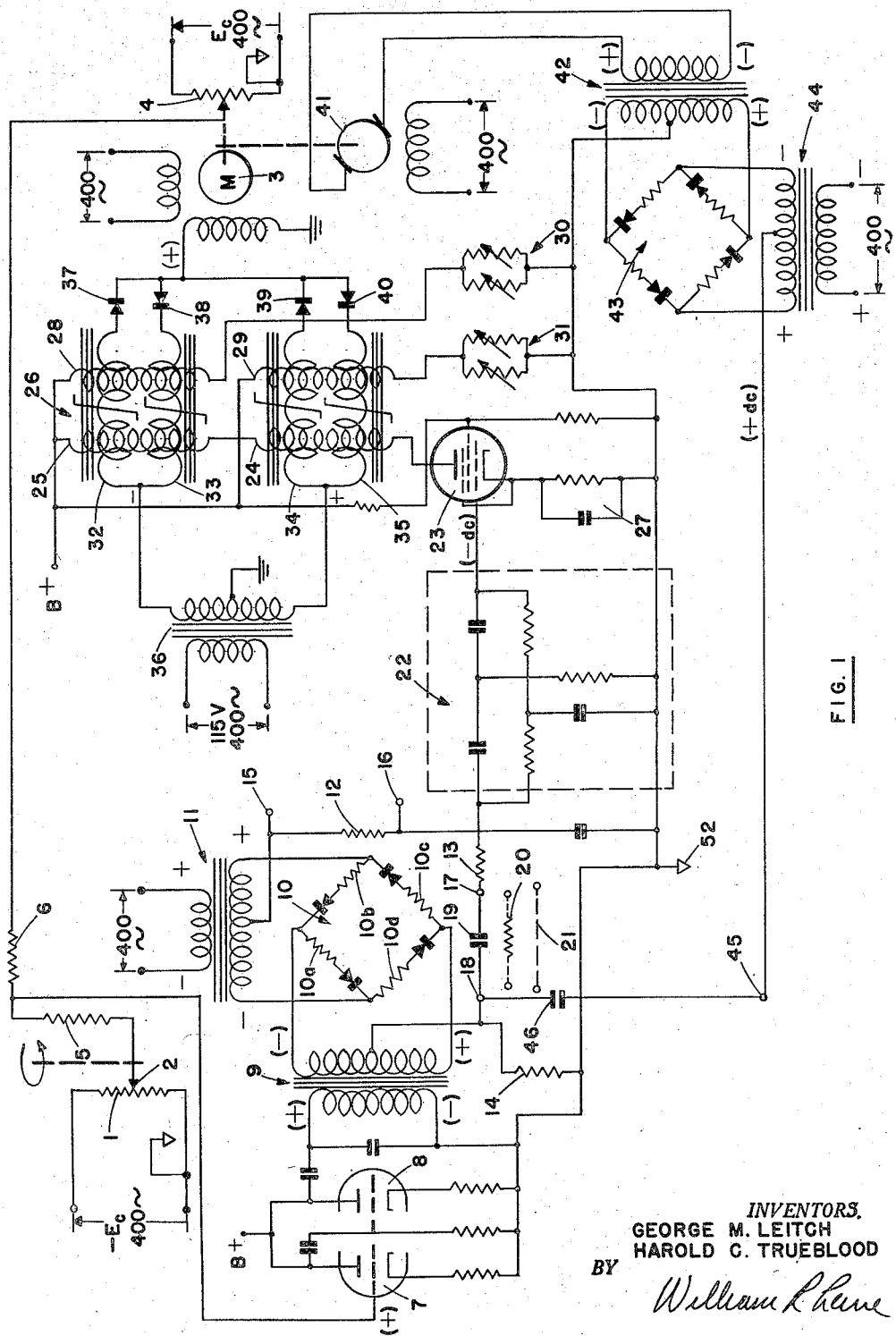

In Fig. 1, a carrier frequency source of voltage $E_c$ is connected across potentiometer 1. The signal input to the device of this invention is an independent variable such as a shaft rotation, which physically positions the wiper 2 of potentiometer 1. This is a method of modulating a carrier in accordance with an independent variable. An exact, corresponding shaft rotation of motor 3 is the desired output of the servo system. Therefore, the output shaft of motor 3 is connected to drive the wiper of potentiometer 4 which is excited in a manner similar to potentiometer 1. Potentiometers 1 and 4 are excited by separate sources of opposite polarity with respect to signal ground, as shown. The voltage at the wipers of the potentiometers are compared through resistors 5 and 6 in a ratio determined by the relative values of those resistors. Resistors 5 and 6, form a difference circuit, indicating the difference in positioning of the wiper of potentiometer 1 with respect to the wiper of potentiometer 4. The difference signal is transmitted from the junction of resistors 5 and 6 to the control grid of triode 7. The cathode of triode 7 is connected through a resistor to the signal ground at point 52. The input to the grid of amplifier tube 7 is, therefore, an electrical error signal indicating the difference in position between the wiper of potentiometer 1 and that of potentiometer 4; or, what is the same, the signal indicates the positional error of the output shaft of the motor with respect to the independently variable input shaft of potentiometer 1. The output of tube 7 is resistance-capacitance coupled to amplifier tube 8, which, in turn, is capacitively coupled to the primary of transformer 9. The secondary of transformer 9 is connected to bridge demodulator 10 which is carrier-switched by the carrier received through transformer 11. Current limiting resistors 10a, 10b, 10c, and 10d are matched to 1% in order to provide a balanced output. The demodulated signal output is taken at the center taps of the transformers 9 and 11.

At this point, D.-C. equalization is utilized to modify the gain and the phase angle of the signal as desired for various signal frequencies. Resistors 12, 13, and 14 are a portion of the equalizing network. If the amplifier is encased, terminals 15 and 16 are placed in a convenient access position in order that resistor 12 may be shunted by other components if desirable. Terminals 17 and 18 are likewise placed in an accessible position in order that capacitance 19 may easily be replaced by resistor 20 or direct connection 21 (indicated in dotted lines) according to the equalization desired in a particular application.

The term "D.-C." refers to the fact that the carrier has been demodulated and that the envelope is being equalized. The term "equalization" refers, as stated above, to modifying the gain and phase angle of the signal as desired for various signal frequencies. Explanation of this technique may be found in volume 25 of the M. I. T. Radiation Laboratory Series, "Theory of Servo Mechanism, page 114, paragraph 3.13." The D.-C. equalizer is there referred to as a "network for operating on D.-C. error voltage." In other standard texts it may be referred to as compensating or stabilizing networks. It is commonly referred to by engineers as D.-C. equalization."

The equalizer output passes through parallel T filter 22 which is particularly designed to remove the carrier ripple from the signal before amplification by pentode 23. The equalizer and parallel T filter form, essentially, an R.-C. network which acts to yield a filtered signal having the required gain at various signal frequencies. Required gain in a servo system is generally experimentally derived to obtain a motor response that is stable over a range of signal frequencies.

The control windings 24 and 25 of self-saturating magnetic amplifier 26 are driven by the plate of a single tube, pentode 23. A lead network 27, in the cathode circuit of pentode 23 reduces the phase shift inherent in the magnetic amplifier. Bias windings 28 and 29 are connected directly to the B+ and through resistor pairs 30 and 31, respectively, to ground. These resistor pairs require individual adjustment to allow correct bias current in the magnetic amplifier. The load windings 32, 33, 34, and 35 of the magnetic amplifier are wound upon low-loss saturable cores, such as those made of grain-oriented silicon steel, and are excited from the primary power source through transformer 36.

Motor 3 is driven by the phase-reversible output of magnetic amplifier 26 received through diodes 37 and 38 or 39 and 40 and rotates accordingly. When no signal is being received through amplifiers 7 and 8, pentode 23 conducts enough current to bias magnetic amplifier 26 so that it has no output. Zero signal in (to tube 7) produces zero signal out (to motor 3). Upon receiving a positive signal, pentode 23 conducts less current and the magnetic amplifier supplies a current of a certain phase to rotate motor 3. Upon receiving a negative signal, pentode 23 conducts more than the magnetic amplifier output reverses its phase and motor 3 rotates in the opposite direction. A servo loop according to the position of the shaft of motor 3 has thus far been described.

Figure 3:
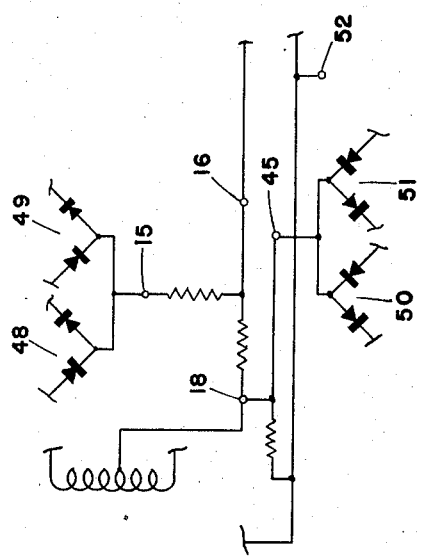
Fig. 3 is an alternate feedback circuit and an equalizing circuit to be used in the embodiment of Fig. 2.
Figure 4:
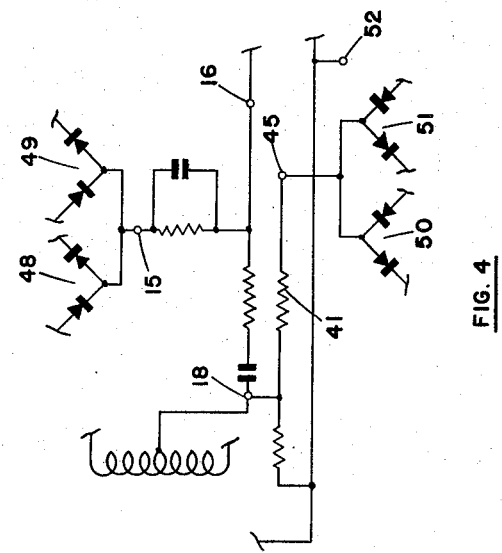
Fig. 4 is another alternate feedback circuit and an equalizing circuit to be used in the embodiment of Fig. 2.

For added stability and in order to acquire characteristics of particular motor velocity, acceleration, and response time, a generator, or tachometer, feedback is utilized. Several types of ready-made motor-generator units or a combination of a two-phase, reversible motor and tachometer are obtainable and are suitable in this system. The generator, or tachometer, 41 is rotated by the motor. The generator output passes through transformer 42 and bridge demodulator 43 which is switched at carrier frequency received through transformer 44. The feedback output is taken from the center taps of transformers 42 and 44. The center tap from transformer 42 is connected to the signal ground. The center tap from transformer 44 is connected to accessible terminal 45. If acceleration feedback is desired, terminal 45 is connected to terminal 18 by a capacitor 46 as shown. If velocity feedback is desired, terminal 45 is connected to terminal 18 directly or through resistance as shown in Figs. 3 and 4. Feedback to this point is considerably simpler than attempting to accomplish A.-C. feedback to tube 7 to be added to the error signal.

By the use of carrier-switched bridge demodulators 10 and 43, both in the signal circuit and the generator feedback circuit, a D.-C. current which reverses according to the modulation of the input carrier is supplied to pentode 23. As a further result, the servo amplifier is insensitive to quadrature voltages. That is, these demodulators are phase sensitive and if there is a quadrature feedback voltage amplified by tubes 7 and 8, these demodulators will reject this voltage. As a result, the quadrature voltage will not appear as a signal at pentode 23.

Figure 2:
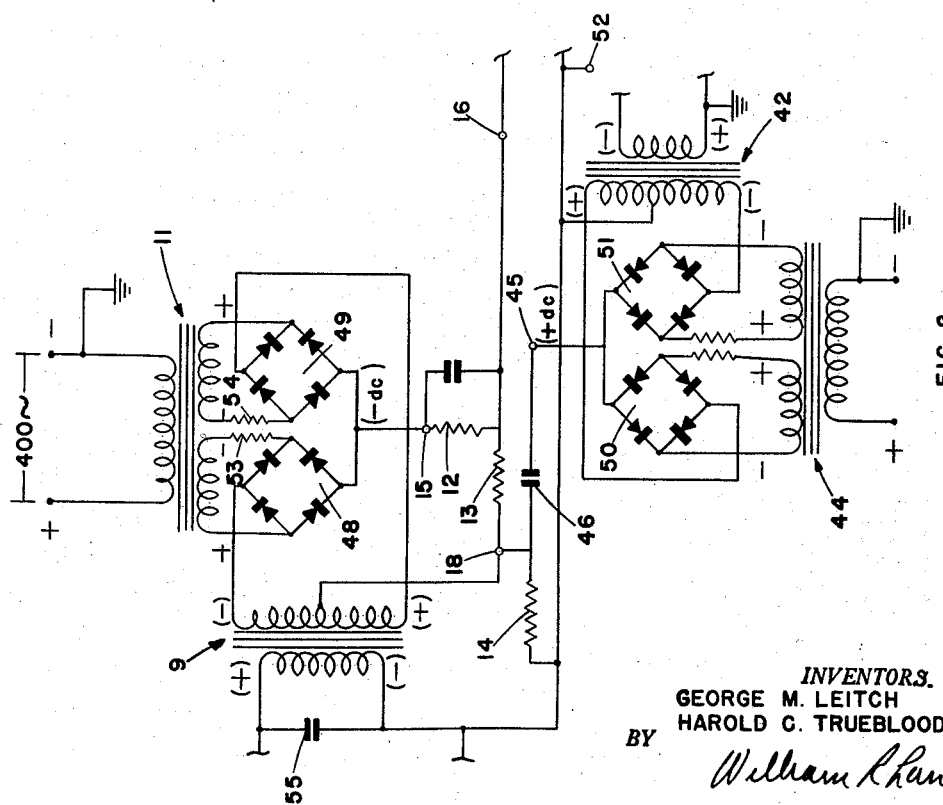
Fig. 2 is a schematic drawing of modified demodulator circuits.

Fig. 2 is a modified demodulator scheme, in which transformer 11 has a double secondary winding, having bridge demodulators 48 and 49 each connected across a respective winding. Current-limiting resistors 53 and 54 are in series with respective secondary windings. Terminals 15, 16, and 18 are accessibly located as previously described in order that desired equalization may be obtained by plug-in components located entirely outside the amplifier package. The optimum equalization circuit required may be calculated, or determined by testing the open loop response of the amplifier under the required load over a desired range of signal frequencies. The procedure for doing this is well known in the servo art. Examples of the plug-in components for equalization are those shown between terminals 15, 18, and 16 in Figs. 1, 2, 3, or 4.

The generator demodulation is obtained in the modification of Fig. 2 by two-bridge demodulators 50 and 51 connected across respective secondary windings of transformer 44. Terminal 45 is conveniently located to allow plug-in component substitution between terminals 18 and 45 depending on the type of feedback desired from the generator-demodulator bridges 50 and 51. The capacitive feedback circuit shown between terminals 45 and 18 in Figs. 1 and 2 provides negative feedback according to motor acceleration. The feedback of Fig. 3 between terminals 45 and 18 is negative feedback according to motor velocity, and, Fig. 4 is a negative velocity feedback with a resistance which reduces the gain of the generator feedback loop. Terminal 52 is a signal ground point which is also the B− lead. In cases of low level signals, this signal ground is kept isolated from the alternating power supply ground.

Several polarity connections are noted in the drawings. These are A.-C. potentials and are relative only. Those polarities in parentheses indicate relative signal potentials.

Double-bridge demodulation as in Fig. 2 does not require the close matching of components required in the demodulating circuit of Fig. 1 and, further, it removes the fundamental carrier frequency, 400 cycles. Frequencies up to about 5000 cycles work satisfactorily as a carrier. However, capacitor 55 across the primary of transformer 9 must be removed at the higher carrier frequencies and the parallel T filter must be designed in each case to attenuate the second harmonic of the carrier. It is not necessary that the power supply to the magnetic amplifier 26 through transformer 36 be of the same frequency as the carrier. The demodulating frequency supplied to transformer 11 must be the same as the carrier frequency applied to potentiometers 1 and 4.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a servo control system, a motor, means for modulating a carrier frequency in accordance with the rotational position of said motor, means for modulating a carrier frequency in accordance with an independently varying quantity, means for amplifying the difference between said modulated carriers, a demodulator connected to receive the output of said amplifying means, a D.-C. equalizer connected to receive the output of said demodulator, a filter connected to receive the output of said D.-C. equalizer and adapted to remove the carrier ripple therein, a D.-C. amplifier connected to receive the output of said filter, a magnetic amplifier connected to receive the output of said D.-C. amplifier and control said motor in accordance therewith, generator means driven by said motor for modulating a carrier in accordance with the motion of the shaft of said motor, a second demodulator connected to receive said carrier modulated in accordance with the motion of the shaft of said motor, and a feedback circuit from said second demodulator to said D.-C. equalizer.

2. In a servo control system, a two-phase reversible motor, a carrier frequency source, means for modulating said carrier frequency in accordance with the rotational position of said motor, means for modulating said carrier frequency in accordance with an independently varying quantity, means for amplifying the difference between said modulated carriers, a phase-sensitive demodulator connected to receive the output of said amplifier, a D.-C. equalizer connected to receive the output of said demodulator, a filter connected to receive the output of said D.-C. equalizer and adapted to remove the carrier ripple therein, a D.-C. amplifier connected to receive the output of said filter, and a phase-reversible magnetic amplifier connected to receive the output of said D.-C. amplifier and control said two-phase motor in accordance therewith, a generator driven by said motor and adapted to produce a modulated carrier in accordance with the motion of the shaft of said motor, a second phase-sensitive demodulator connected to receive the output of said generator, and a negative feedback circuit from said second demodulator to said D.-C. equalizer.

3. In a servo control system, a two-phase, reversible motor generator combination, means for modulating a carrier in accordance with the position of the shaft of said motor, means for modulating a carrier in accordance with an independent variable, an A.-C. amplifier adapted to amplify the difference between said modulated carriers, a demodulator comprising carrier switched bridge rectifiers connected to receive the output of said A.-C. amplifier, a D.-C. equalizer connected to receive the output of said demodulator, a filter connected to receive the output of said equalizer and adapted to remove the carrier ripple therefrom, a D.-C. amplifier connected to receive the output of said filter comprising a single tube connected to drive a magnetic amplifier having a phase-reversible output, a phase-reversible magnetic amplifier connected to receive the output of said D.-C. amplifier and connected to drive said motor, means for exciting said generator at carrier frequency, a second demodulator comprising carrier switched bridge rectifiers connected to receive the output of said generator, negative feedback means from said second demodulator to said D.-C. equalizer.

4. In a servo control amplifier, an A.-C. amplifier, a phase-sensitive demodulator connected to receive the output of said A.-C. amplifier, an equalizing network connected to receive the output of said demodulator, a filter adapted to remove the carrier ripple from the output of said equalizing network, a D.-C. amplifier connected to receive the output of said filter, an amplifier having a phase-reversible output and connected to receive the output of said D.-C. amplifier and a two-phase reversible motor connected to receive the output of said phase-reversible amplifier, means for modulating a carrier in accordance with the rotational position of the shaft of said motor, means for modulating a carrier in accordance with an independently varying quantity, and means for coupling the difference between said modulated carriers to the input of said A.-C. amplifier.

5. In a motor control system, a motor, means for producing a modulated carrier indicative of a positional error of the shaft of said motor, an A.-C. amplifier adapted to receive said signal modulated carrier, a phase-sensitive bridge-type demodulator connected to receive the output of said A.-C. amplifier, a D.-C. equalizer connected to receive the output of said demodulator, a filter connected to receive the output of said equalizer and adapted to attenuate the carrier ripple in the output of said equalizer, and an amplifier connected to receive the output of said filter and to drive said motor, and wherein is included generator means driven by said motor, providing a modulated carrier in accordance with the motion of the shaft of said motor, a second demodulator adapted to receive the output of said generating means, feedback means from the output of said second demodulator to said D.-C. equalizer.

6. In a servo control system, a motor, means for modulating a carrier frequency in accordance with the rotational position of said motor, means for modulating a carrier frequency in accordance with an independently varying quantity, means for amplifying the difference between said modulated carriers, a demodulator connected to receive the output of said amplifying means, a D.-C. equalizer connected to receive the output of said demodulator, a filter connected to receive the output of said D.-C. equalizer and adapted to remove the carrier ripple therein, amplifying means connected to receive the output of said filter and control said motor in accordance therewith, tachometer means driven by said motor for modulating a carrier in accordance with the motion of the shaft of said motor, a second demodulator connected to receive the output of said tachometer means, and a feedback circuit from said second demodulator to said D.-C. equalizer.

References Cited in the file of this patent
UNITED STATES PATENTS

| | | |
|---|---|---|
| 2,233,415 | Hull | Mar. 4, 1941 |
| 2,436,807 | Isbister | Mar. 2, 1948 |
| 2,476,496 | Kliever | July 19, 1949 |
| 2,492,779 | Anderson | Dec. 27, 1949 |
| 2,676,291 | Perkins et al. | Apr. 20, 1954 |

OTHER REFERENCES

Electronic Instruments, Greenwood, Holdam and Macrae, McGraw-Hill Book Co., 1948, pages 371, 381 and 386. ( Copy in Div. 26.)